United States Patent [19]
Kasuya et al.

[11] Patent Number: 4,733,226
[45] Date of Patent: Mar. 22, 1988

[54] OVERLAPPED-TRANSFER DETECTING APPARATUS FOR MAIL ARTICLE

[75] Inventors: Shigenobu Kasuya; Yoshihiro Matsuda; Tetsuo Umeda, all of Tokyo, Japan

[73] Assignee: NEC Corporation, Japan

[21] Appl. No.: 1,163

[22] Filed: Jan. 7, 1987

[30] Foreign Application Priority Data

Jan. 7, 1986 [JP] Japan .................................. 61-1078

[51] Int. Cl.4 ........................................... G08B 21/00
[52] U.S. Cl. .................................... 340/674; 209/900; 271/263
[58] Field of Search ............................... 340/673, 674; 198/502.2; 209/564, 563, 900, 586; 250/222.1, 222.2, 221; 271/262, 263, 264, 265, 258

[56] References Cited
U.S. PATENT DOCUMENTS

| 3,918,586 | 11/1975 | Tyler et al. | 209/586 X |
| 3,955,812 | 5/1976 | Suda et al. | 271/265 X |
| 4,121,716 | 10/1978 | Luperti et al. | 209/564 |
| 4,136,780 | 1/1979 | Hunter et al. | 209/900 X |
| 4,504,961 | 3/1985 | Horiguchi | 271/263 X |

Primary Examiner—Glen R. Swann, III
Assistant Examiner—Tat K. Wong
Attorney, Agent, or Firm—Laff, Whitesel, Conte & Saret

[57] ABSTRACT

A detector for use in a mail sorter is positioned along a path over which articles (letters, postcards, etc.) travel while in an upright position. A problem with such paths is that sometimes articles are overlapped, and sometimes small articles are hidden behind large articles. The invention detects such overlaps by (1) detecting height changes of any single article which trips a detector only once, and (2) forcibly displacing one article relative to the other of two overlapped articles. The change of length resulting from the forced displacement is detected.

10 Claims, 7 Drawing Figures

OVERLAPPED-TRANSFER DETECTING APPARATUS FOR MAIL ARTICLE

BACKGROUND OF THE INVENTION

This invention relates to an apparatus for handling mail articles such as post cards and envelopes, and more particularly to an overlapped-transfer detecting apparatus which detects that a plurality of mail articles are overlapped while they are being transferred.

In a mail handling apparatus, mail articles should be transferred individually, i.e., piece-by-piece. When a plurality of mail articles are fed together to the handling apparatus, in an overlapped manner, the handling apparatus can not perform its normal operation and encounters trouble, such as a jam.

According to a prior art overlapped-transfer detecting apparatus, a shifting device is provided in a transport path of a mail article. Such a shifting device is composed of two rollers, one of which is rotated at a speed which is different from the transfer speed, the other roller being idly rotated. Overlapped mail articles are shifted relative to each other when they are passed between the two rollers, because one mail article engaging the rotated roller has a speed which is different from the transfer speed. The one article is accelerated or decelerated as compared with the other mail article engaging the idle roller, which maintains its transfer speed. In addition to the shifting device, two length-measuring devices are provided before and after the shifting device, along the transport path. If the length of the mail article measured by the upstream measuring device is not equal to the length measured by the downstream measuring device, the overlapped-transfer is detected. As a result, in a mail handling apparatus, the overlapped mail articles are rejected or fed to a separating apparatus.

However, if the apparent length of the overlapped mail articles is not changed after the shifting operation, the prior art detecting apparatus can not detect the overlapped-transfer. In practice, when rectangular envelopes are transferred in the longitudial direction in a mail handling apparatus, some envelopes are frequently turned up and become in an up-standing state. The up-standing envelope is easily overlapped on another longitudially-transferred one. In this case, the width of the up-standing envelope is entirely behind the length of the non-up-standing envelope. This relationship is sometimes not changed even after the two envelopes are shifted, so that the shifting operation can not change the length of overlapped mail articles in the transfer direction. When two envelopes strongly adhere to each other, the length of the overlapped envelopes is not changed even by the shifting operation.

SUMMARY OF THE INVENTION

It is, therefore, an object of the present invention to provide a overlapped-transfer detecting apparatus for mail articles, the apparatus being capable of detecting an overlapped-transfer even when one mail article is behind another one in the transfer direction, or when two mail articles strongly adhere to each other.

According to the present invention, an overlapped-transfer detecting apparatus for a mail article comprises a scanner disposed along a transport path for cyclically scanning mail articles transferred through the transport path, while they are standing vertically. A height measuring circuit is coupled to the scanner for measuring the height of the mail articles for each scan to produce a height signal. A transition detector is coupled to the height measuring circuit for detecting a transition of the height signal with respect to the mail article.

DESCRIPTION OF PREFERRED EMBODIMENTS OF THE INVENTION

Figure 1:
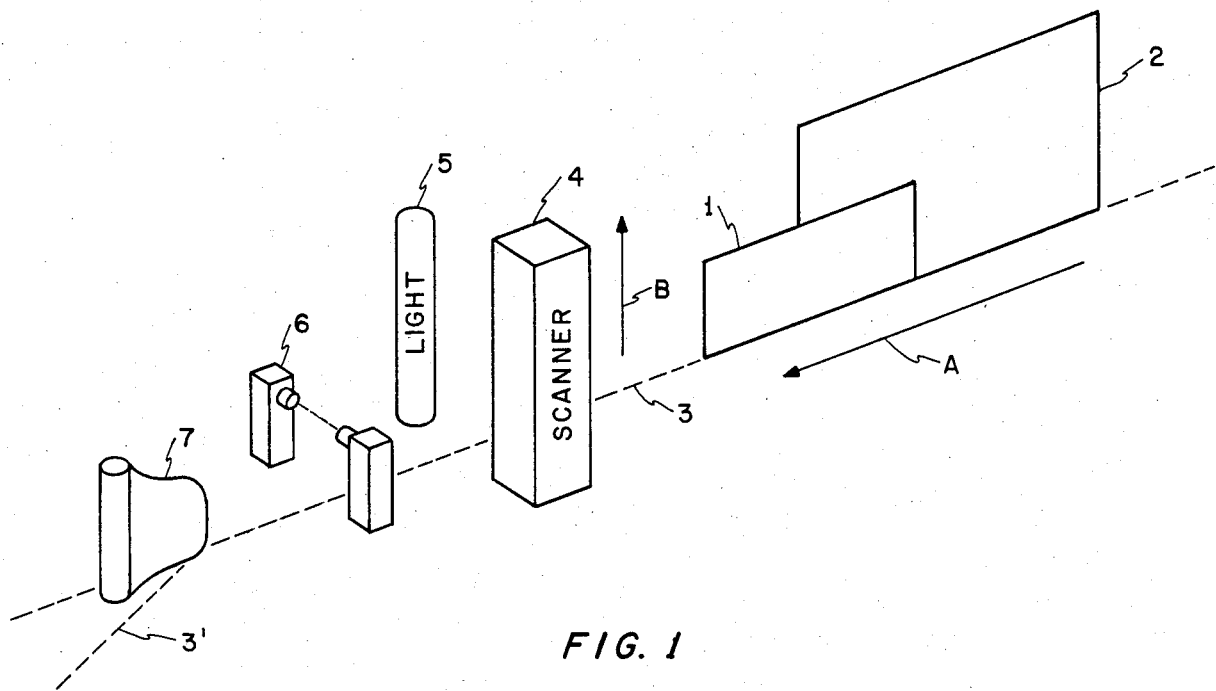
FIG. 1 is a schematic diagram showing an embodiment of the present invention.

FIG. 1 shows a schematic diagram of an embodiment according to the present invention. Overlapped mail articles 1 and 2 are being transferred through a transport path 3 in a direction A with a standing vertical state. A line scanner 4, a light source 5 and a photo-detector 6 are provided along the transport path 3. Further, a diverter 7 is provided to transfer overlapped mail articles into a rejectin path (or a separating device) 3'.

Figure 2:
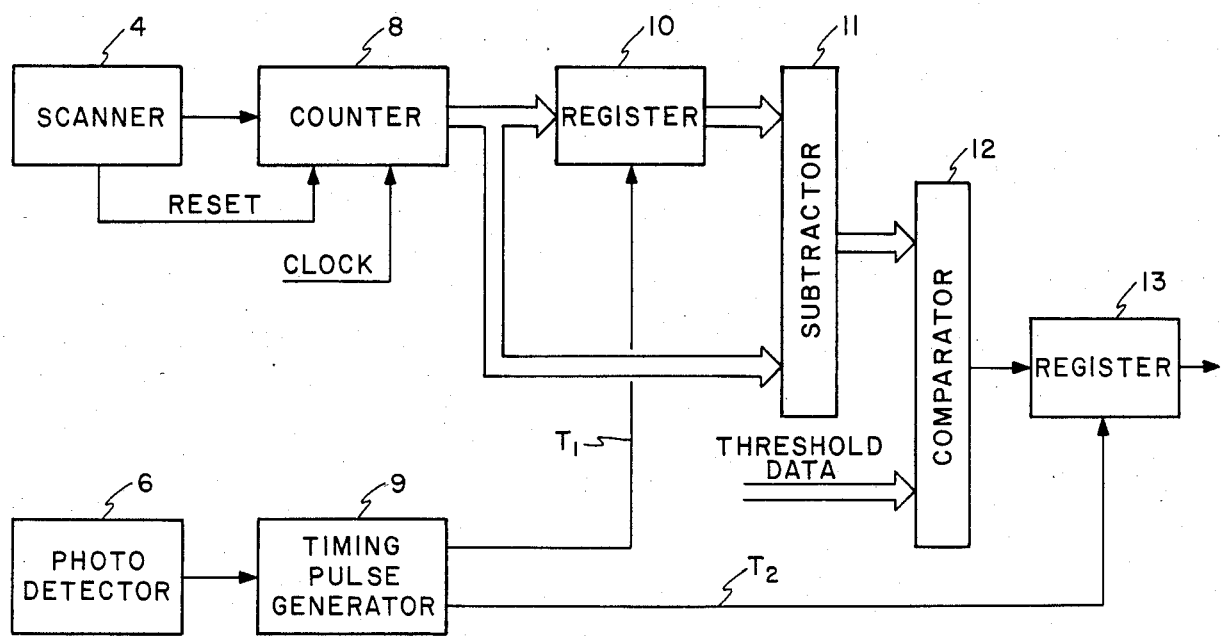
FIG. 2 is a block diagram of a signal processing circuit for the embodiment shown in FIG. 1.

FIG. 2 shows a block diagram of a signal processing circuit for the embodiment of FIG. 1. The line scanner 4 cyclically scans a mail article in a vertical direction B and delivers a scanned signal having a pulse width corresponding to the height of the mail article, for every scan. A counter 8 counts a train of high speed clock pulses under the control of the scanned signal delivered from the scanner 4. As a result, the counter 8 outputs are a counted data representing the height of the mail articles, at every scan.

Figure 3:
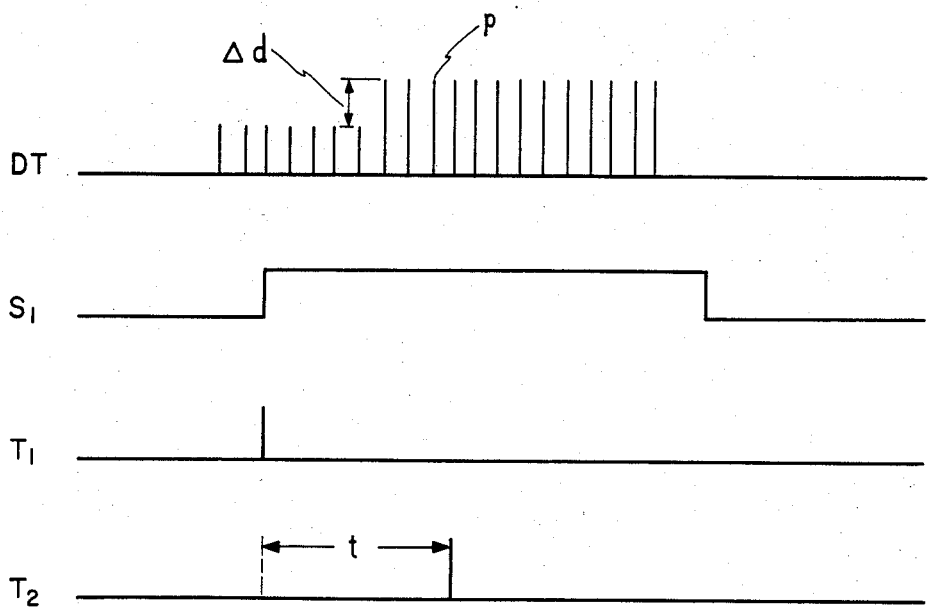
FIG. 3 is a timing chart which explains the operation of the signal processing circuit of FIG. 2.

With reference to FIG. 3, showing a timing chart, a data train DT indicates a train of counted clock or data pulses, which is the output the counter 8. The height of each bar in the pulse train DT correspond to the value of each counted data. A signal $S_1$ represents the output of the photo-detector 6. In FIG. 2, a timing pulse generator 9 receives the signal $S_1$ from the photo-detector 6 and generates a timing pulse $T_1$ and a timing pulse $T_2$ as shown in FIG. 3. The timing of the pulse $T_1$ is coincident with the leading edge of the detection signal $S_1$. The timing pulse $T_2$ is generated after the timing pulse $T_1$, by a predetermined time period t. This period t is set to generate the timing pulse $T_2$ just before the trailing edge of the shortest mail article which may be expected to pass the photo-detector 6.

A register 10 stores the counted data delivered from the counter 8 at the timing of the timing pulse $T_1$. A substractor 11 delivers a height difference by calculating a difference between the counted data from the counter 8 and the stored data from the register 10. Therefore, in the data train DT of FIG. 3, the subtractor 11 delivers the height difference $\Delta d$ after a time point P. A comparator 12 compares the height difference which is delivered from the subcontractor 11 with a threshold data. When the height difference is greater than the threshold data, the comparator 12 determines that overlapped mail articles are being transferred and delivers an overlapped-transfer detection signal having a high level, for example.

A latch circuit 13 latches the overlapped-transfer detection signal at the timing of the pulse $T_2$. In this embodiment, by determining the timing of the timing pulse $T_2$ as shown in FIG. 3, an overlapped-transfer can be accurately detected. Accordingly, the diverter 7 feeds the overlapped-mail articles into the rejection path 3' in response to the overlapped-transfer detection signal from the latch circuit 13. Otherwise, by using the overlapped-transfer detection signal, it is possible to operate a separating apparatus (not shown).

Figure 4:
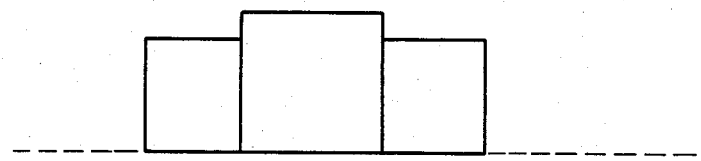
FIG. 4 shows an example of an overlapped-transfer of mail articles which the prior art can not detect.

FIG. 4 shows an example of overlapped mail articles which can not be detected by the prior art, but which can be completely detected by the present invention.

Figure 5:
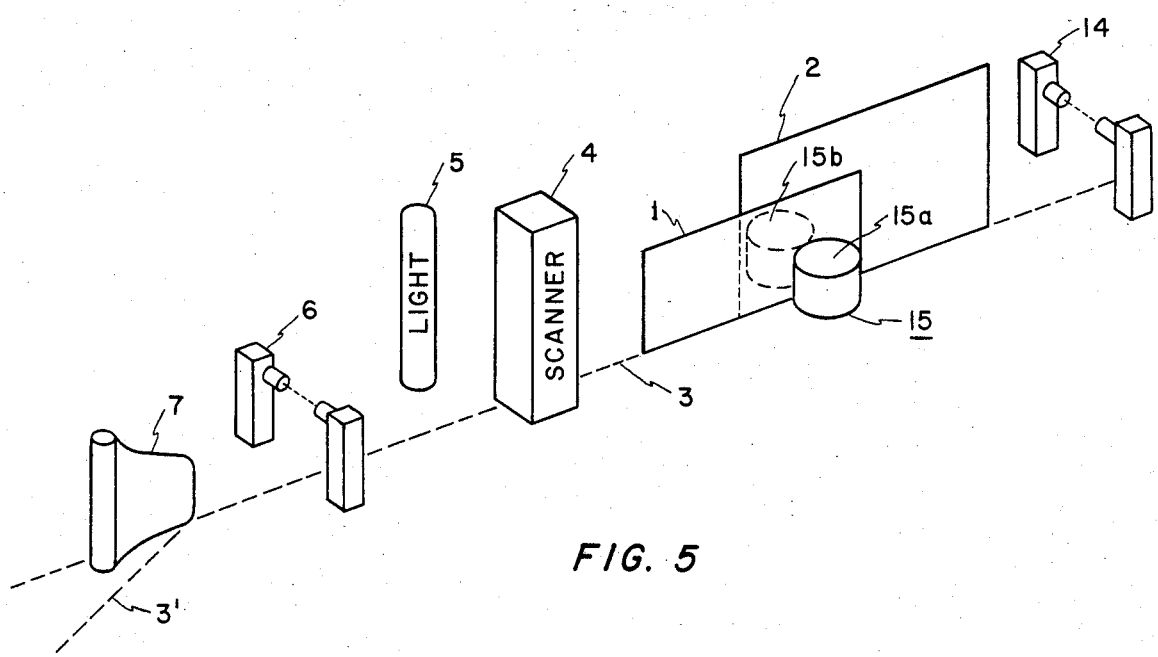
FIG. 5 is a schematic diagram showing a second embodiment of the present invention.

Next, a second embodiment of the present invention will be described with reference to FIG. 5. According to the first embodiment of FIG. 1, it is impossible to detect an overlapped-transfer when overlapped mail articles have the same height. The second embodiment overcomes this disadvantage of the first embodiment. In FIG. 5, in addition to the construction of FIG. 1, another photo-detector 14 and a shifting mechanism 15 are added in the upstream position. The shifting mechanism 15 includes two rotating rollers 15a and 15b respective having different rotation speeds to shift the relative position between two over-lapped mail articles 1 and 2.

Figure 7:
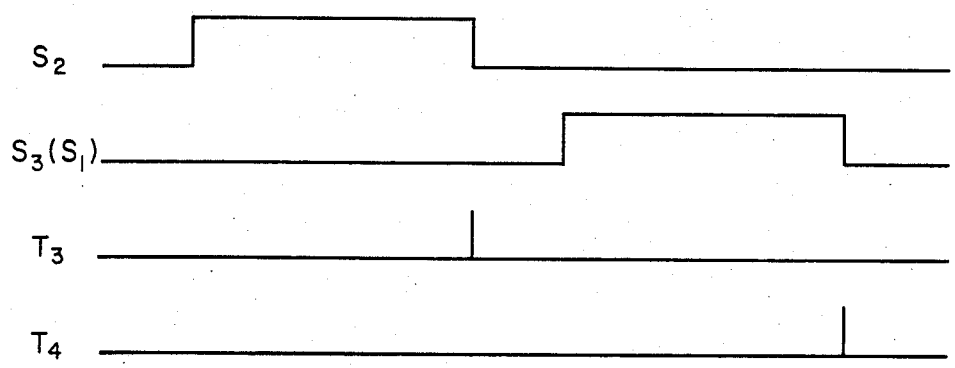
FIG. 7 is a timing chart which explains the operation of the signal processing circuit of FIG. 6.
Figure 6:
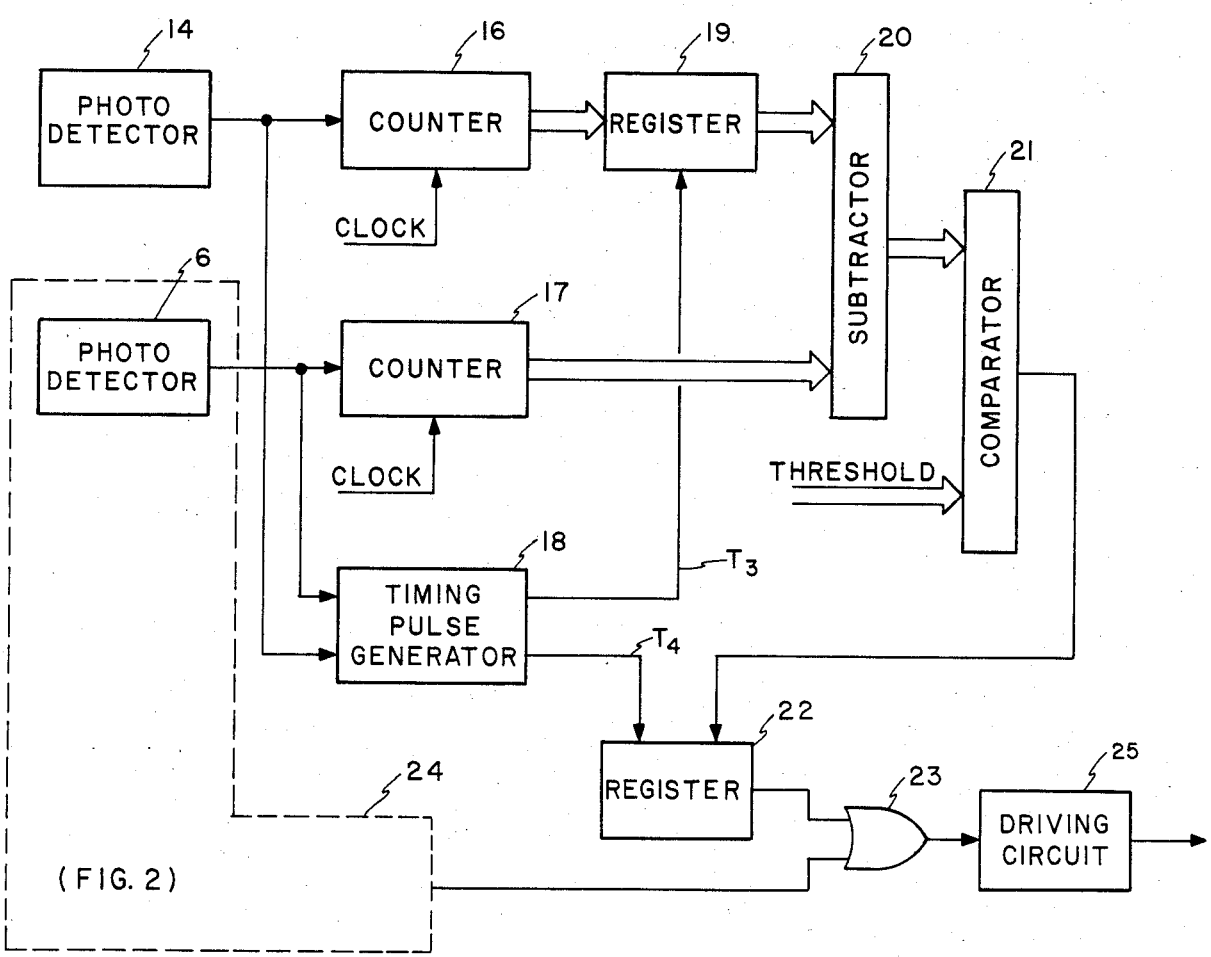
FIG. 6 is a block diagram of a signal processing circuit for the second embodiment shown in FIG. 5.

FIG. 6 shows a block diagram of a signal processing circuit for the second embodiment of FIG. 5. A counter 16 counts high speed clock pulses under the control of the output delivered from the photo-detector 14, to measure the length of a transferred mail article before it reaches the shifting mechanism 15. Another counter 17 counts the high speed clock pulses under the control of the output of the photo-detector 6 to measure the length of the transferred mail article after the shifting mechanism 15. A timing pulse generator 18 generates timing pulses $T_3$ and $T_4$ in response to the output signals $S_2$ and $S_3$ of the photo-detectors 14 and 6, respectively, as shown in FIG. 7. In FIG. 7, the timing pulses $T_3$ and $T_4$ are generated at the trailing edges of the output signals $S_2$ and $S_3$ of the photo-detectors 14 and 6, respectively.

Referring back to FIG. 6, a register 19 stores the counted data delivered from the counter 16 at the timing of the timing pulse $T_3$. A subtractor 20 calculates a length difference between the lengths at the upstream position and at the downstream position with reference to the shifting mechanism 15. A comparator 21 compares the length difference delivered from the subtracter 20 with threshold data and produces one overlapped-transfer detection signal when the length difference is greater than the threshold data.

A latch circuit 22 latchs the overlapped-transfer detection signal from the comparator 21 at the timing of the timing pulse $T_4$. The overlapped-transfer detection signal from the latch circuit 22 is supplied to an OR-gate 23. The OR-gate 23 also receives another overlapped-transfer detection signal which is detected by the block 24 which corresponds to the first embodiment shown in FIG. 2. The OR-gate overlapped transfer detection signal is applied to a diverter driving circuit 25, to divert the diverter 7.

According to the second embodiment of FIG. 5, the overlapped-transfer detecting method measures the length of a mail article. The other overlapped-transfer detecting method measures the height of the mail article. These two measurements are combined and, therefore, a more accurate overlapped-transfer detection can be performed.

In case a very small mail article is entirely behind a very large mail article, which is both longer and wider than the small one, the present invention can not detect the overlapped-transfer. However, such a case rarely happens, in practice. Therefore, the present invention is practical and efficient for a mail handling apparatus.

As described above, the present invention can provide an accurate and stable overlapped-transfer detecting apparatus by utilizing the detection of a transition of the height of a mail article. Furthermore, according to the present invention, it becomes possible to detect an inclined-transfer of a mail article by scanning an upper portion of the mail article.

Those who are skilled in the art will readily perceive how to modify the invention. Therefore, the appended claims are to be construed to cover all equivalent structures which fall within the true scope and spirit of the invention.

What is claimed is:

1. An apparatus for detecting articles while they are being moved along a transport path, said apparatus comprising detector means for detecting each article as it moves along said path, scanner means for detecting the height of each of said articles throughout its entire length while said articles are moving past said detector means, and means responsive to an apparent change in height for signaling a possible overlap condition to indicate that probably said detector means has responded once to more than one article.

2. The apparatus of claim 1 and means responsive to said overlap signal for diverting said articles from said transport path.

3. The apparatus of claim 1 wherein said scanner means comprises a plurality of vertically aligned sensors, a source of clock pulses, counter means responsive to said sensors for counting clock pulses as said articles move along and while said articles are moving past said scanner means whereby the output of said counter means varies with the height of the scanned article, means for detecting the length of said articles, and means responsive to both said counter means and said length detecting means for signaling an overlap when the output of said counter means varies during an output of said length detecting means which indicates that a single article having a non-uniform height has passed along said path.

4. The apparatus of claim 1 and means along said transport path and upstream of said scanner means for forcibly separating overlapping articles by a distance which virtually assures a difference in height of overlapped articles, whereby it is unlikely that a small article can completely hide behind a large article as it passes said scanner means.

5. The apparats of claim 1 and wherein said detector means measures a length of an article as it moves along said transport path, a second detector means positioned along said transport path and upstream of said scanner means for measuring the length of said article, means intermediate said two detector means for forcibly moving one of a pair of overlapped articles relative to the other of said pair of overlapped articles, whereby the total length of said overlapped articles is likely to change, means for comparing the lengths measured by the two detector means, and means for signaling an overlapped condition when the compared lengths indicate a change after said forcible movement has occurred.

6. The apparatus of claim 1 wherein said transport path comprises means for transporting mail articles in an upright position.

7. An overlapped-transfer detecting apparatus for flat articles comprising:
- transferring means for transferring flat articles through transport path while in an upstanding state;
- scanning means disposed along said transport path for cyclically scanning each of said flat articles transferred through said transport path in a direction perpendicular to a transfer direction of said flat articles;
- measuring means coupled to said scanning means for cyclically measuring a height of said flat article to produce a train of a plurality of data pulses, each train representing said height for each scan; and
- detecting means coupled to said measuring means for detecting a transition of data in said train in order to produce an overlapped-transfer detecting signal.

8. An overlapped-transfer detecting apparatus as claimed in claim 7, wherein said measuring means includes counter means coupled to said scanning means for counting a train of clock pulses under the control of the output of said scanning means to produce said train of data pulses, and said detecting means includes a photp-detector means disposed along said transport path for detecting said flat articles transferred through said transport path, register means for storing in the datum in said train of the plurality of data pulses in responses to a timing signal delivered from said photo-detector means to produce a stored datum, and comparator means for comparing said stored datum with the data delivered from said counter to produce said overlapped-transfer detection signal when a comparison result of said comparator means exceeds a predetermined level.

9. An overlapped-transfer detecting apparatus for a mail article comprising:
- means for transferring mail articles through a transport path while in an upstanding state;
- means disposed along said transport path for cyclically scanning said mail articles transferred through said transport path to cyclically produce a height signal which is indicative of a height of said mail article;
- means for detecting a change in said height signal to produce a first overlapped detection signal;
- forcing means disposed along said transport path for applying a force with different speeds to opposite sides of said mail article being transferred through said transport path;
- first means disposed before said forcing means and along said transport path for measuring a length of said mail article, said length being measured in a transfer direction to produce a first length signal;
- second means disposed after said forcing means and along said transport path for making a second measurement of a length of said mail article in said transfer direction to produce a second length signal; and
- means for comparing said first and second length signals to produce a second overlapped-transfer detection signal when a comparison result of said comparing means exceeds a predetermined level.

10. An overlapped-transfer detecting apparatus for a mail article comprising:
- scanner means disposed along a transport path for cyclically scanning a mail article while it is being transferred through said transport path while in an upstanding vertical state;
- a height measuring circuit coupled to said scanner for measuring the height of said mail article for each scan to produce a height signal; and
- transition detector means coupled to said height measuring circuit for detecting a transition of said height signal with respect to said mail article.

* * * * *